Patented Oct. 3, 1922.

1,430,920

UNITED STATES PATENT OFFICE.

ALWIN MITTASCH AND MAX SCHÜMANN, OF LUDWIGSHAFEN-ON-THE-RHINE, GERMANY, ASSIGNORS, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

DESULPHURIZING GASES.

No Drawing. Application filed August 20, 1920. Serial No. 404,940.

*To all whom it may concern:*

Be it known that we, ALWIN MITTASCH and MAX SCHÜMANN, citizens of the German Empire, residing at Ludwigshafen-on-the-Rhine, Germany, have invented new and useful Improvements in Desulphurizing Gases (for which I have filed application in Germany, August 16, 1919), of which the following is a specification.

The present invention relates to an improved method of removing sulfur compounds from gases, or gas-mixtures. The problem of desulphurizing gases is of an eminent importance as the presence of sulfur compounds is very obnoxious in several directions, e. g. by spoiling the air when the gas is burnt, or by interfering with the chemical reactions to which the gas may be subjected. However the removal of sulfur compounds offers great practical difficulties. Catalytic masses used therefor will soon lose their efficiency, either by a chemical alteration which makes them unsuitable for further use, or by the deterioration of the mass which makes it necessary to replace it frequently.

Now we have found that the desulfurization of gases can be carried out without the contact mass employed therefor losing its efficiency in a continued use, by proceeding in the following manner:

The gas which is to be deprived of sulfur compounds e. g. illuminating gas, is first led through a purification vessel, in which it is treated either with a suitable washing liquid, such as moderately concentrated sulfuric acid, or which, more suitably, contains a porous mass, e. g. charcoal, or active charcoal. Certain admixtures, in particular such of a tarry nature, which otherwise would injure the removal of sulfur compounds are thereby precipitated, or absorbed, whilst ethylene and sulfur compounds pass on unaltered. After leaving this vessel, the gas is passed through a second vessel where it is treated, in the presence of oxygen, with active charcoal. The oxygen may be added by introducing at least the amount required for the oxidation of the hydrogen sulfid, preferably of air, either before, or more suitably after the purification vessel. A reaction takes place between the sulfuretted hydrogen and the oxygen with the well-known result that sulfur is formed and deposited onto the charcoal. When the latter no longer absorbs sulfur it is treated with a suitable solvent, or otherwise deprived of the sulfur and can then again be taken into use. In case the purification of the gas was effected with the aid of an acid, a small addition of ammonia or ammonium carbonate should preferably be made to the gas entering the reaction vessel or to the catalytic mass contained in the latter. According to the efficiency of the purifying treatment and to the size of the several vessels, one purification vessel may be combined with one, or several, reaction vessels, or a plurality of purification vessels may be provided for each one reaction vessel. Of course the porous mass contained in the purification vessel will become inefficient in the course of its use and must be replaced, at suitable intervals, or, it can be revived by treating with suitable solvents or with steam.

Now what we claim is:

1. The process of desulphurizing gas which consists in first passing the gas through charcoal, then adding to it at least the required amount of oxygen for oxidizing the sulfuretted hydrogen and passing the mixture through active charcoal.

2. The process of desulphurizing gas which consists in first passing the gas through charcoal, then adding to it at least the required amount of oxygen for oxidizing the sulfuretted hydrogen and passing the mixture through active charcoal, extracting the sulfur from the charcoal, when the latter is saturated, and taking it into fresh use.

In testimony whereof we have hereunto set our hands.

ALWIN MITTASCH.
MAX SCHÜMANN.